Nov. 14, 1950      E. A. ZEMPEL      2,529,988

TOOL

Filed June 14, 1946

INVENTOR
EDWARD A. ZEMPEL
BY Wallace and Connow
ATTORNEYS

Patented Nov. 14, 1950

2,529,988

UNITED STATES PATENT OFFICE 2,529,988

TOOL

Edward A. Zempel, Milwaukee, Wis., assignor to Walter T. Meinhardt, Cook County, Ill.

Application June 14, 1946, Serial No. 676,670

1 Claim. (Cl. 10—147)

The present invention relates to tools and particularly to tools and tool holders incorporating gauges for use in limiting and controlling the length of stroke or depth of penetration of tools such as drills, taps, reamers, and the like.

In the past, tools such as drills, taps, reamers, screw drivers and the like, have been used in various types of drills, presses, boring machines, and the like, equipped with or in conjunction with means for rotating and advancing the tool toward a piece of work, or for advancing the work toward the tool. In mechanism of the general character referred to it is commonly desirable or necessary to limit and control the extent of relative movement between the tool and the work. For example, it may be desirable to limit accurately the depth of penetration of a drill, reamer, or tap, or to control the distance through which a screw-driver, wrench or other tool may operate to insert studs, screws, bolts or the like into a piece of work.

In machines of the character described above, it has been a practice in the past to include gauge means which limit a working stroke, depth of penetration, or approaching movement between a tool and a piece of work. Such gauge means are commonly associated with feeding or advancing mechanism and may be designed to stop the machine entirely, stop feeding operations, or reverse the feed mechanism when a desired operating stroke or depth of penetration has been completed.

One example of a machine of the general character referred to above is shown and described in the patent to Mirrielees, No. 1,388,875, patented August 30, 1921. In this patent, gauge means forming a part of the machine serve to limit and control feeding operations and may be utilized to cause the feeding mechanism to reverse when a desired length of stroke or depth of penetration has been effective.

In the patent to French, No. 2,076,767, patented April 13, 1937, there is disclosed a drilling machine incorporating gauge means which are effective to limit the length of stroke or depth of penetration and are actuated by the pressure applied to the tool to stop operation of the tool. In various other mechanisms known in the prior art, means responsive to excessive axial pressure on the tool are provided for stopping and for reversing the feeding movement. In the case of taps and other thread cutting devices, the direction of rotation of the tool holder or chuck is reversed as the feed is reversed. With other tools of the character mentioned above, reversal of rotation may or may not be provided.

While mechanisms of the character aforesaid have been widely and successfully used in the prior art, the gauge means employed have not been entirely satisfactory in many instances. Gauges used in the prior art have involved connections with and modification of the feed mechanism or other part of the operating machine, and because of their remoteness from the tool and the work, they have not always been as simple, direct and accurate in operation as might be desirable.

It is an object of my invention, therefore, to apply gauge means directly to or in close relation to operating tools of the character mentioned above so that they may directly contact elements of the articles being worked on and thereby accurately control the working stroke or depth of penetration of the tool with respect to the work.

A further object of my invention is to assemble gauge means of the character described above with a tool or tool holder in a manner to provide for quick, accurate and positive adjustment of said gauge means.

A still further object is to combine simple and effective gauge means with a tool holder which can be used for various tools and to do so in such a manner that the gauge means surrounds and closely follows and controls the working movements of said various tools.

Other and further objects of the present invention will be apparent from the following description and claims and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

Figure 1:
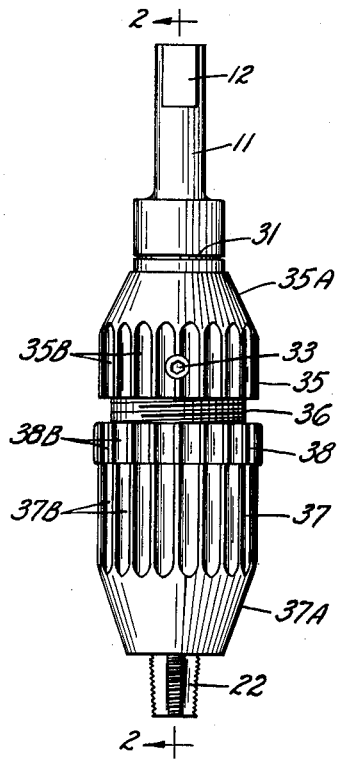
Fig. 1 is an elevational view of a tool embodying my invention.

Referring first to Fig. 1, there is shown a tool which embodies my invention. The tool embodies a holder or shank 11 which is formed at its upper end with one or more flattened faces 12, 12, so that it may be held securely for positive rotation by a standard chuck, or by any of the various chucks commonly used in standard machines, not shown. The tool is designed for use in drill presses, boring machines and the like. Such machines may include a table, chuck, or other structure 20 for holding a piece of work, indicated generally at W, Fig. 2. Means may be provided for advancing and retracting the tool toward and away from the work, as is well known in the art, or, if desired, the work W may be moved toward and away from the tool.

The shank or holder 11 preferably is recessed or drilled at its lower end, as seen in the drawings and indicated at 21 to receive and hold a tool 22. In the drawings, the tool is shown as a tap for cutting internal threads in a piece of work W, but it will be understood that the tool might be a drill, a reamer, a screw driver, a wrench, or any other tool suitable for use in machines of the general character to which this invention is applicable. In other words, the tool is preferably one which is rotated and also advanced axially to perform its function. The shank 11 is provided with a lower and an upper set screw 23 and 24, for holding the tool 22 in the recess 21. The tool of course has a shank 25 of suitable length and cross section to fit in the recess 21 and its upper end is preferably provided with one or more flat surfaces 26 for engagement by the upper set screw 24. If desired, such flattened surface may be extended downwardly for engagement by the lower set screw 23 as well as the upper screw 24, and the entire shank 25 and the recess 21 may be of angular cross section if preferred. However, it is preferred, for economy in manufacturing, that the latter elements be generally circular in cross section.

Toward its upper end, the shank or holder 11 is provided with a depth line 31 in the form of an annular marking or thin groove for the purpose of furnishing a visual indication of the position of the tool. Below this line the shank 11 has a wide annular groove 32 which is adapted to receive the inner end of a set screw or screw pin 33 carried by a sleeve member 35 slidably and rotatably carried by the shank 11. The screw pin 33 preferably does not engage the bottom of the groove 32 but is slightly spaced therefrom so as to permit the sleeve to rotate and slide freely with respect to the shank 11. The screw pin 33 is adapted to engage either side of the groove 32 to limit axial displacement of the sleeve member 35 with respect to the shank 11.

The sleeve member 35 is preferably formed to fit closely but freely about the shank 11. It comprises an integral threaded shank portion 36 which projects downwardly and is of reduced diameter. This shank is adapted to receive an internally threaded gauge member 37 and a lock nut 38. The parts 35, 37 and 38 are preferably of substantially the same outer diameter and are all provided with fluted surfaces as shown at 35B, 37B and 38B, but they may be provided instead with heavily knurled surfaces to facilitate manual rotation and adjustment. The threaded shank 36 is of substantial length in order that the adjustable gauge 37 may be positioned thereon at various points to vary the depth of penetration of the tool over a wide range. The threads on the shank are preferably relatively fine so that adjustments may be made accurately. The parts 35 and 37 are tapered at their upper and lower ends, respectively, to form smooth tapers merging toward the shank 11 and tool 22, as indicated at 35A and 37A.

Figure 2:
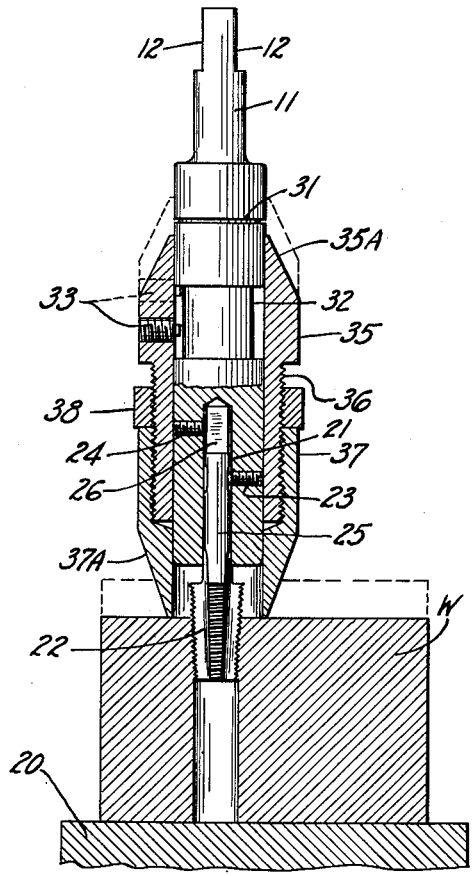
Fig. 2 is a vertical sectional view of the tool of Fig. 1 taken substantially along the line 2—2, Fig. 1.

As shown in Fig. 2, when the tool is used on a piece of work W, the gauge member 37 is adjusted on shank 36 to limit the working stroke of the tool. The lock nut 38 is tightened against gauge 37 to retain the adjusted position. The drill press, boring machine, or other apparatus is then operated to force the tool into the work. The gauge member 37 may be suspended from the stem or shank 11 by contact of the screw pin 33 with the lower end of the wide groove 32.

As the tool is inserted into the work W, the gauge member 37 rests on the surface thereof, as shown in Fig. 2. The gauge floats freely, being unconstrained for either rotary or axial movement. As the tool descends, the gauge 37 rises with respect to the tool, the screw pin 33 moving upwardly with respect to the groove 32. In the full line position of Fig. 2, the gauge is shown resting on the work piece W, with the pin 33 about midway in the groove 32.

When the desired depth of penetration has been reached, the pin 33 contacts the upper edge of annular groove 32 and prevents further descent of the shank 11. Such a condition is shown in dotted lines in Fig. 2. This results in applying pressure upwardly against the chuck, not shown, which carries the tool, and a control device associated with such chuck is effective to stop the chuck drive mechanism. The control device is preferably pressure responsive and is preferably effective to reverse the direction of rotation of the tool so as to withdraw the tool 21 from the work W. In the case of a tap for cutting threads, such as is shown in the drawing, it is essential that the drive for the chuck be reversible for withdrawing the tool. The direction of feed must also be reversed. For other tools, such as drills, reamers and screw drivers, it may be sufficient merely to reverse the direction of feed without changing the direction of tool rotation. Mechanisms for accomplishing such functions automatically are well known in the art and form no part of the present invention, but it should be particularly noted that whatever mechanism is used, it must be responsive to the upward pressure which results when the gauge 37, through pin 33, prevents further downward movement of the tool shank or holder 11.

While it is preferred that operation be fully automatic for some purposes, the invention is equally applicable to machines which are merely stopped when the depth of penetration or limit of working stroke has been completed. Thus when pin 33 applies upward force to prevent further advance of the tool holder 11, mechanism may be operated in response to such pressure to stop further rotation and axial movement of the drive chuck. Manual means, as well known in the prior art, may then be operated to reverse the drive and withdraw the tool.

It will be understood that although the above description refers to penetration of a tool and advancing the tool toward the work, the work may be advanced, and may also be rotated, if desired, the tool being held against axial and/or rotary movement. The gauge member 37, in such case, may be effective to control the work advancing means rather than a tool advancing means as will be obvious.

It is also to be understood that the tool 22 need not be of rotary type, nor must it necessarily be a penetrating tool. It may be merely a reciprocative tool, the working stroke of which is to be accurately limited by pressure controlled means. The adjustable gauge elements make it possible to determine the exact length of stroke. It will be appreciated that some pressure may be involved in the advancing of any tool and the pressure applied when the gauge reaches the limit of its movement is in reality a pressure differential which is effective to perform the desired control function. The control device is of course suitably responsible to the particular degree of pressure, or pressure differential, resulting when the gauge determines the stroke or penetration limit.

Thus, while I have illustrated and described the preferred embodiments of my invention, it is to be understood that these are capable of variation and modification and I therefore do not wish to be limited to the precise details set forth, but desire to avail myself of such changes and alterations as fall within the purview of the following claim.

I claim:

A tool comprising adjustably constantly secured together elongated sleeve members which while connected are movable one relative to the other, and having a common smooth axial bore therethrough of uniform diameter, an elongated tool holder disposed in said bore and having an end portion thereof projecting therebeyond, the tool holder having a snug sliding rotatable and reciprocatory fit in the said bore, the tool holder inwardly of the said projecting end and concentric with respect to one of the sleeve members having formed thereon a circumferential groove of less cross-sectional diameter than the remainder thereof and thus providing inner and outer spaced circular shoulders, the last mentioned sleeve member having an opening in its wall opposite the said circumferential groove in the tool holder, a pin in said opening and having its inner end disposed in the said groove, the adjustable connection between the said sleeves allowing for different adjustments, whereby the outward stroke of the tool holder and the tool element that is carried thereby, and which tool element projects beyond the end of the said other sleeve, is regulated, this said other sleeve having an extreme free end portion that is adapted to engage the work in spaced relation to the said tool, and the said pin limiting the inward or outward movement of the tool holder and tool element relative to both of the said sleeves.

EDWARD A. ZEMPEL.

REFERENCES CITED

The following references are of record in the file of this patent:

UNITED STATES PATENTS

| Number | Name | Date |
|---|---|---|
| 318,654 | Rathbun | May 26, 1885 |
| 567,793 | Riddell | Sept. 15, 1896 |
| 568,932 | Wilcox | Oct. 6, 1896 |
| 569,896 | Van | Oct. 20, 1896 |
| 974,239 | Dalton | Nov. 1, 1910 |
| 1,030,732 | Jenkins | June 25, 1912 |

FOREIGN PATENTS

| Number | Country | Date |
|---|---|---|
| 22,542 | Denmark | Dec. 27, 1916 |